(12) United States Patent
Tobin et al.

(10) Patent No.: US 10,920,745 B2
(45) Date of Patent: Feb. 16, 2021

(54) WIND TURBINE ROTOR BLADE COMPONENTS AND METHODS OF MANUFACTURING THE SAME

(71) Applicant: General Electric Company, Schenectady, NY (US)

(72) Inventors: James Robert Tobin, Simpsonville, SC (US); Stephen Bertram Johnson, New Castle, NH (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 15/819,083

(22) Filed: Nov. 21, 2017

(65) Prior Publication Data

US 2019/0153996 A1    May 23, 2019

(51) Int. Cl.
*F03D 1/06* (2006.01)
*B33Y 80/00* (2015.01)
(Continued)

(52) U.S. Cl.
CPC ............ *F03D 1/0675* (2013.01); *B29C 53/04* (2013.01); *B29C 70/28* (2013.01);
(Continued)

(58) Field of Classification Search
CPC ...... F03D 1/065; F03D 1/0675; F03D 1/0683; F03D 1/0641; F03D 1/0633;
(Continued)

(56) References Cited

U.S. PATENT DOCUMENTS

RE19,412 E    1/1935  Zaparka
2,450,440 A   10/1948 Mills
(Continued)

FOREIGN PATENT DOCUMENTS

CN    101906251 A    12/2010
CN    103358564 A    10/2013
(Continued)

OTHER PUBLICATIONS

U.S. Appl. No. 15/351,486, filed Nov. 15, 2016.
(Continued)

*Primary Examiner* — Aaron R Eastman
*Assistant Examiner* — Sang K Kim
(74) *Attorney, Agent, or Firm* — Dority & Manning, P.A.

(57) ABSTRACT

A rotor blade segment of a wind turbine includes a seamless leading edge surface. A method of manufacturing a rotor blade segment of a wind turbine, the rotor blade segment having a seamless leading edge surface, includes forming an outer skin of the rotor blade segment. The outer skin defines a continuous outer surface. The continuous outer surface includes a pressure side surface extending between a pressure side aft edge and a pressure side forward edge, a suction side surface extending between a suction side forward edge and a suction side aft edge, and the seamless leading edge surface extends between the pressure side forward edge and the suction side forward edge. After folding the outer skin, the pressure side surface is positioned opposite the suction side surface and the pressure side aft edge is proximate the suction side aft edge.

14 Claims, 5 Drawing Sheets

(51) Int. Cl.
   *B29C 53/04*    (2006.01)
   *B29C 70/28*    (2006.01)
   *B29D 99/00*    (2010.01)
   *B29C 64/10*    (2017.01)
   *B29K 105/06*    (2006.01)
   *B29K 101/12*    (2006.01)

(52) U.S. Cl.
   CPC .......... *B29D 99/0028* (2013.01); *B33Y 80/00* (2014.12); *B29C 64/10* (2017.08); *B29K 2101/12* (2013.01); *B29K 2105/06* (2013.01); *F05B 2230/50* (2013.01); *F05B 2240/2211* (2013.01); *F05B 2280/6003* (2013.01)

(58) Field of Classification Search
   CPC ......... F03D 1/0608; F03D 1/06; B33Y 10/00; B33Y 80/00; B29C 53/04; B29C 64/10; B29C 70/28; B29K 2105/06; F05B 2230/50; F05B 2240/2211; F05B 2280/6003
   USPC ...................................................... 416/229 R
   See application file for complete search history.

(56) References Cited

U.S. PATENT DOCUMENTS

| | | | |
|---|---|---|---|
| 2,451,131 A | 10/1948 | Vidal | |
| 2,503,450 A | 4/1950 | Nebesar | |
| 3,000,446 A | 9/1961 | Warnken | |
| 3,093,219 A | 6/1963 | Ramme | |
| 3,137,887 A | 6/1964 | Mannino et al. | |
| 3,321,019 A | 5/1967 | Dmitroff et al. | |
| 3,528,753 A | 9/1970 | Dutton et al. | |
| 3,586,460 A | 6/1971 | Toner | |
| 3,956,564 A | 5/1976 | Hillig | |
| 4,319,872 A | 3/1982 | Lupke | |
| 4,329,119 A | 5/1982 | Baskin | |
| 4,474,536 A | 10/1984 | Gougeon et al. | |
| 4,626,172 A | 12/1986 | Mouille et al. | |
| 4,718,844 A | 1/1988 | Dickhut | |
| 5,059,109 A | 10/1991 | Dickhut | |
| 5,088,665 A | 2/1992 | Vijgen et al. | |
| 5,346,367 A | 9/1994 | Doolin et al. | |
| 6,264,877 B1 | 7/2001 | Pallu De La Barriere | |
| 6,890,152 B1 | 5/2005 | Thisted | |
| 7,059,833 B2 | 6/2006 | Stiesdal et al. | |
| 7,364,407 B2 | 4/2008 | Grabau | |
| 7,458,777 B2 | 12/2008 | Herr | |
| 7,637,721 B2 | 12/2009 | Driver et al. | |
| 7,976,275 B2 | 7/2011 | Miebach et al. | |
| 7,988,421 B2 | 8/2011 | Bakhuis et al. | |
| 8,007,624 B2 | 8/2011 | Stiesdal | |
| 8,062,728 B2 | 11/2011 | De Beats | |
| 8,083,488 B2 | 12/2011 | Fritz | |
| 8,092,187 B2 | 1/2012 | Bell | |
| 8,162,590 B2 | 4/2012 | Haag | |
| 8,273,806 B2 | 9/2012 | Guadagno et al. | |
| 8,317,479 B2 | 11/2012 | Vronsky et al. | |
| 8,376,450 B1 | 2/2013 | Long et al. | |
| 8,540,491 B2 | 9/2013 | Gruhn | |
| 8,602,761 B2 | 12/2013 | Arrizabalaga | |
| 8,657,581 B2 | 2/2014 | Pilpel et al. | |
| 8,673,106 B1 | 3/2014 | Jolley et al. | |
| 8,678,746 B2 | 3/2014 | Haag | |
| 8,708,691 B2 | 4/2014 | Matsen et al. | |
| 8,747,098 B1 | 6/2014 | Johnson et al. | |
| 8,865,798 B2 | 10/2014 | Merle et al. | |
| 8,877,116 B2 | 11/2014 | Grabau | |
| 8,932,024 B2 | 1/2015 | Hayashi et al. | |
| 8,961,142 B2 | 2/2015 | Wansink | |
| 8,992,813 B2 | 3/2015 | Robbins et al. | |
| 9,090,027 B2 | 7/2015 | Sutton | |
| 9,150,721 B2 | 10/2015 | Bateman et al. | |
| 9,377,005 B2 | 6/2016 | Yarbrough et al. | |
| 9,434,142 B2 | 9/2016 | Levit | |
| 9,458,821 B2 | 10/2016 | Jacobsen et al. | |
| 9,512,818 B2 | 12/2016 | Richtman | |
| 9,719,489 B2 * | 8/2017 | Stewart | F03D 1/0675 |
| 10,273,935 B2 * | 4/2019 | Albert | F03D 1/0675 |
| 2004/0253114 A1 | 12/2004 | Gunneskov et al. | |
| 2007/0065290 A1 | 3/2007 | Herr | |
| 2007/0077150 A1 | 4/2007 | Llorente Gonzalez | |
| 2007/0107189 A1 | 5/2007 | Prichard | |
| 2009/0068017 A1 | 3/2009 | Rudling | |
| 2009/0074585 A1 | 3/2009 | Koegler et al. | |
| 2009/0140527 A1 | 6/2009 | Pawar | |
| 2009/0148300 A1 | 6/2009 | Driver et al. | |
| 2009/0155084 A1 | 6/2009 | Livingston et al. | |
| 2009/0301648 A1 | 12/2009 | Hogg | |
| 2010/0047070 A1 | 2/2010 | Slot | |
| 2010/0121475 A1 | 5/2010 | Lyons | |
| 2010/0135806 A1 | 6/2010 | Benito | |
| 2010/0135815 A1 | 6/2010 | Bagepalli | |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097211 A1 | 4/2011 | Rudling | |
| 2011/0097326 A1 | 4/2011 | Luehrsen | |
| 2011/0100540 A1 | 5/2011 | Mathew | |
| 2011/0103965 A1 | 5/2011 | Matthew | |
| 2011/0135467 A1 | 6/2011 | Saddoughi et al. | |
| 2011/0142635 A1 | 6/2011 | Frizt | |
| 2011/0142667 A1 | 6/2011 | Miebach et al. | |
| 2011/0142668 A1 | 6/2011 | Rao | |
| 2011/0142670 A1 | 6/2011 | Pilpel | |
| 2011/0176928 A1 | 7/2011 | Jensen | |
| 2011/0200444 A1 | 8/2011 | Garcia | |
| 2011/0223028 A1 | 9/2011 | Stege et al. | |
| 2011/0243736 A1 | 10/2011 | Bell | |
| 2011/0243750 A1 | 10/2011 | Gruhn | |
| 2011/0266721 A1 | 11/2011 | Song et al. | |
| 2011/0268558 A1 | 11/2011 | Driver | |
| 2011/0286853 A1 | 11/2011 | Kristensen | |
| 2012/0009069 A1 | 1/2012 | Grove-Nielsen | |
| 2012/0027590 A1 | 2/2012 | Bonnet | |
| 2012/0027610 A1 | 2/2012 | Yarbrough | |
| 2012/0027612 A1 | 2/2012 | Yarbrough | |
| 2012/0027613 A1 | 2/2012 | Yarbrough | |
| 2012/0121430 A1 | 5/2012 | Olsen et al. | |
| 2012/0128810 A1 | 5/2012 | Arriola Arizabalaga et al. | |
| 2012/0134848 A1 | 5/2012 | Ramirez Jimenez et al. | |
| 2012/0138218 A1 | 6/2012 | Dean et al. | |
| 2012/0183408 A1 | 7/2012 | Noerlem | |
| 2012/0186730 A1 | 7/2012 | Shindo | |
| 2012/0263913 A1 | 10/2012 | Karem | |
| 2013/0108455 A1 | 5/2013 | Quiring et al. | |
| 2013/0164133 A1 | 6/2013 | Grove-Nielsen | |
| 2013/0186558 A1 | 7/2013 | Comb | |
| 2013/0241117 A1 | 9/2013 | Lind | |
| 2014/0072715 A1 | 3/2014 | Jones et al. | |
| 2014/0178204 A1 | 6/2014 | Livingston et al. | |
| 2014/0186175 A1 | 7/2014 | Baehmann et al. | |
| 2014/0205454 A1 | 7/2014 | Giovannetti et al. | |
| 2014/0295187 A1 | 10/2014 | Jacobsen | |
| 2014/0322023 A1 | 10/2014 | Tapia | |
| 2014/0328692 A1 | 11/2014 | Riddell et al. | |
| 2014/0334930 A1 | 11/2014 | Rob | |
| 2015/0224759 A1 * | 8/2015 | Boon | B29C 70/38 156/324 |
| 2015/0247487 A1 | 9/2015 | Oerlemans et al. | |
| 2015/0308404 A1 | 10/2015 | Dahl | |
| 2015/0316028 A1 * | 11/2015 | Brekenfeld | F03D 1/0675 416/229 R |
| 2015/0322920 A1 | 11/2015 | Jones | |
| 2016/0023433 A1 | 1/2016 | Langone | |
| 2016/0052173 A1 | 2/2016 | Hunter | |
| 2016/0107397 A1 | 4/2016 | Schibsbye | |
| 2016/0146019 A1 | 5/2016 | Pizano et al. | |
| 2016/0168997 A1 | 6/2016 | Garm | |
| 2016/0263844 A1 | 9/2016 | Smith | |
| 2016/0297145 A1 | 10/2016 | Wu | |
| 2016/0319801 A1 | 11/2016 | Smith | |

(56) References Cited

U.S. PATENT DOCUMENTS

| | | | |
|---|---|---|---|
| 2016/0327019 A1 | 11/2016 | Tobin et al. | |
| 2016/0327020 A1 | 11/2016 | Tobin et al. | |
| 2016/0327021 A1 | 11/2016 | Tobin et al. | |
| 2016/0354984 A1 | 12/2016 | Hedges | |
| 2016/0377050 A1* | 12/2016 | Caruso | F03D 1/0675 |
| | | | 416/226 |
| 2016/0377051 A1 | 12/2016 | Caruso et al. | |
| 2016/0377052 A1 | 12/2016 | Caruso et al. | |
| 2017/0015066 A1 | 1/2017 | Herrmann | |
| 2017/0021575 A1 | 1/2017 | Hansen et al. | |
| 2017/0022821 A1 | 1/2017 | Ferber | |
| 2017/0030330 A1 | 2/2017 | Caruso | |
| 2017/0050372 A1 | 2/2017 | Nielsen et al. | |
| 2017/0051718 A1 | 2/2017 | Klitgaard | |
| 2017/0057158 A1 | 3/2017 | Caruso et al. | |
| 2017/0058862 A1 | 3/2017 | Caruso et al. | |
| 2017/0058865 A1 | 3/2017 | Caruso et al. | |
| 2017/0058866 A1 | 3/2017 | Caruso | |
| 2017/0074236 A1 | 3/2017 | Hynum et al. | |
| 2017/0074237 A1 | 3/2017 | Caruso et al. | |
| 2017/0074238 A1 | 3/2017 | Tobin et al. | |
| 2017/0074240 A1 | 3/2017 | Caruso et al. | |
| 2017/0082087 A1* | 3/2017 | Yarbrough | F03D 1/0675 |
| 2017/0082088 A1 | 3/2017 | Yarbrough et al. | |
| 2017/0100902 A1 | 4/2017 | Asmatulu et al. | |
| 2017/0113265 A1 | 4/2017 | Slavens et al. | |
| 2017/0122287 A1 | 5/2017 | Dobbe et al. | |
| 2017/0145990 A1 | 5/2017 | Drack et al. | |
| 2017/0175534 A1 | 6/2017 | Ferber | |
| 2017/0204833 A1 | 7/2017 | Albert et al. | |
| 2017/0225362 A1 | 8/2017 | Anthony et al. | |
| 2017/0252966 A1 | 9/2017 | Susnjara | |
| 2017/0306766 A1 | 10/2017 | Munzer | |
| 2018/0135602 A1 | 5/2018 | Tobin et al. | |
| 2018/0156190 A1 | 6/2018 | Johnson | |
| 2018/0216601 A1 | 8/2018 | Yarbrough | |
| 2018/0223794 A1 | 8/2018 | Tobin et al. | |
| 2018/0229452 A1 | 8/2018 | Ogale | |
| 2018/0264749 A1 | 9/2018 | Albert | |
| 2018/0283349 A1 | 10/2018 | Wardropper | |
| 2018/0311927 A1 | 11/2018 | Tyan | |
| 2019/0001589 A1 | 1/2019 | Salimi | |
| 2019/0032491 A1 | 1/2019 | Nissen et al. | |
| 2019/0153994 A1 | 5/2019 | Tobin | |
| 2019/0178227 A1 | 6/2019 | Hawkins | |
| 2019/0195191 A1 | 6/2019 | Girolamo | |
| 2019/0291861 A1 | 9/2019 | McIntyre et al. | |
| 2019/0293049 A1 | 9/2019 | Roberts | |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435466 A2 | 7/1991 |
| EP | 2204577 A2 | 7/2010 |
| EP | 2653717 A1 | 10/2013 |
| EP | 3037655 A1 | 6/2016 |
| EP | 3138697 A1 | 8/2017 |
| ES | 2371893 | 11/2012 |
| JP | H07102609 B2 * 11/1995 ............ B29C 53/04 |  |
| JP | 2000 317972 A | 11/2000 |
| JP | 2007-009926 A | 1/2007 |
| JP | 2007/092716 A | 4/2007 |
| JP | 2012 158151 A | 8/2012 |
| JP | 2016 032929 A | 3/2016 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2017/092766 A1 | 6/2017 |
| WO | WO2018/015250 A1 | 1/2018 |

OTHER PUBLICATIONS

U.S. Appl. No. 15/424,055, filed Feb. 3, 2017.

Patent Cooperation Treaty; PCT International Search Report; International Application No. PCT/US2018/059374; dated Jun. 26, 2019.

Patent Cooperation Treaty; PCT Written Opinion of the International Searching Authority; International Application No. PCT/US2018/059374; dated Jun. 26, 2019.

CGTech VERICUT, Automated Fibre Placement—wind blade: VERICUT Composite CNC simulation, Sep. 16, 2015, YouTube, retrieved from the Internet on Sep. 28, 2019, URL: https://youtu.be/xFNtTE82DiU (Year: 2015).

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et. al., Additive Manufacturing: Making Imagination the Major Limitation, Journal of Metals, vol. 66, No. 5, Springer, NY, Mar. 11, 2014. pp. 808-816.

Patlolla, New progress in self-healing technology of composite wind turbine blades, Department of Mechanical Engineering, Wichita State Univeristy, https://soar.wichita.edu/handle/10057/5496, Feb. 16, 2012, (Abstract Only).

Matt, Development of Novel Self-Healing Polymer Composites for Use in Wind Turbine Blades http://energyresources.asmedigitalcollection.asme.org/article.aspx?article=2174064, The American Society of Mechanical Engineers, Journal of Energy Resources Technology, vol. 137, Issue 5, Sep. 1, 2015 (Abstract Only).

Teuwen et al., Vacuum infused Thermoplastic Composites for Wind Turbine Blades, 2008 Wind Turbine Blade Workshop—Sandia National Laboratories, Jun. 3, 2008, 22 pages.

* cited by examiner

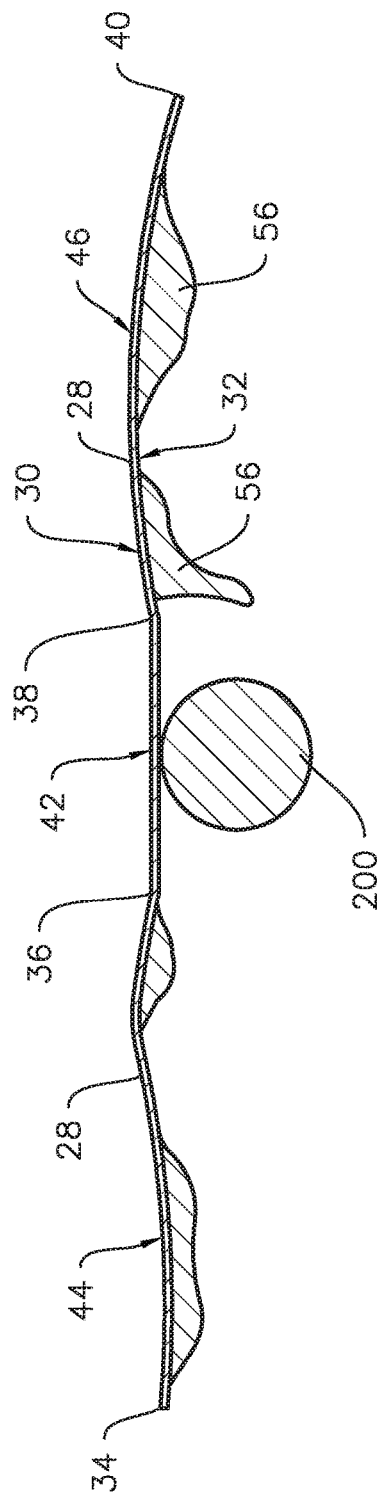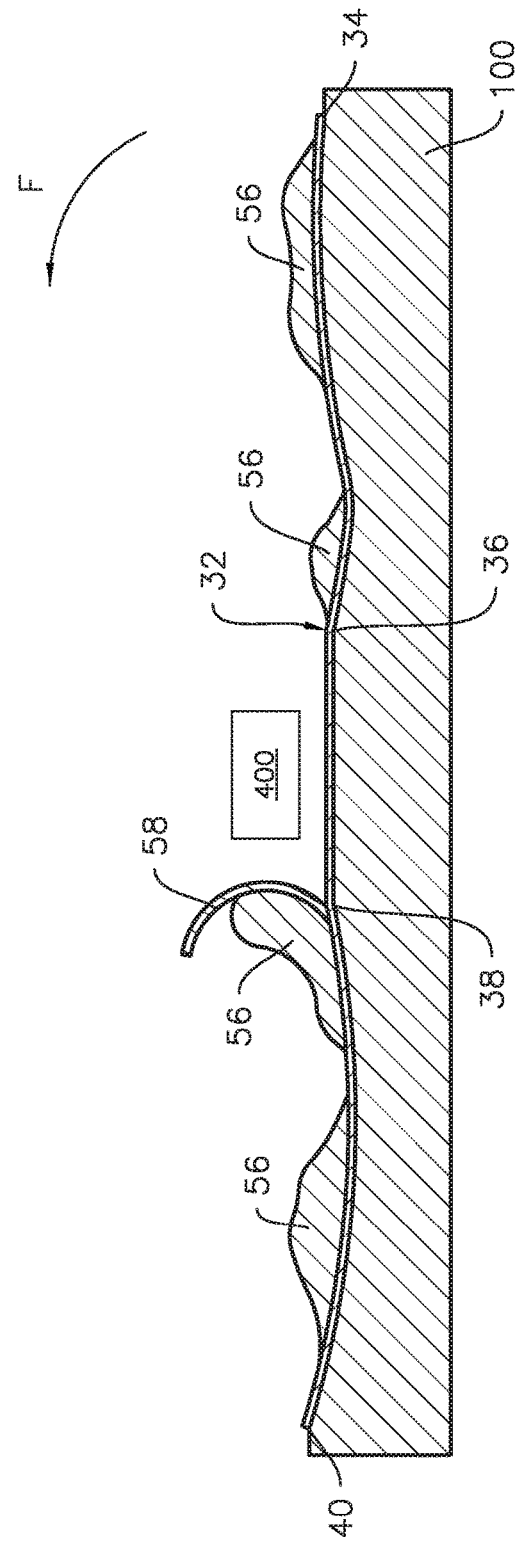

WIND TURBINE ROTOR BLADE COMPONENTS AND METHODS OF MANUFACTURING THE SAME

FIELD OF THE INVENTION

The present disclosure relates in general to wind turbine rotor blades, and more particularly to wind turbine rotor blade components and methods of manufacturing wind turbine rotor blades and components thereof.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Conventional blade manufacturing of large rotor blades involve high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades have a modular panel configuration. Thus, the various blade components of the modular blade can be constructed of varying materials based on the function and/or location of the blade component.

Thus, the art is continually seeking methods of manufacturing wind turbine rotor blades and components thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of manufacturing a rotor blade segment of a wind turbine. The rotor blade segment has a seamless leading edge surface. The method includes providing a generally flat fiber-reinforced outer skin. The generally flat fiber-reinforced outer skin defines a continuous outer surface. The continuous outer surface includes a pressure side surface extending between a pressure side aft edge and a pressure side forward edge, a suction side surface extending between a suction side forward edge and a suction side aft edge, and the seamless leading edge surface extending between the pressure side forward edge and the suction side forward edge. The method also includes forming the fiber-reinforced outer skin into a desired shape corresponding to a contour of the outer surface of the rotor blade. Further, the method includes folding the fiber-reinforced outer skin about the seamless leading edge surface. After folding the fiber-reinforced outer skin, the pressure side surface is positioned opposite the suction side surface and the pressure side aft edge is proximate the suction side aft edge.

In another aspect, the present disclosure is directed to a method of manufacturing a rotor blade segment of a wind turbine. The rotor blade segment has a seamless leading edge surface. The method includes forming an outer skin of the rotor blade segment. The outer skin defines a continuous outer surface. The continuous outer surface includes a pressure side surface extending between a pressure side aft edge and a pressure side forward edge, a suction side surface extending between a suction side forward edge and a suction side aft edge, and the seamless leading edge surface extending between the pressure side forward edge and the suction side forward edge. The method also includes forming at least one three-dimensional reinforcement structure on an inner surface of the outer skin and folding the outer skin around the at least one three-dimensional reinforcement structure. After folding the outer skin, the pressure side surface is positioned opposite the suction side surface and the pressure side aft edge is proximate the suction side aft edge.

In another aspect, the present disclosure is directed to a rotor blade of a wind turbine. The rotor blade includes a main blade structure extending between a root section and a tip section. The root section is configured to be mounted to a rotor hub of the wind turbine. The rotor blade also includes at least one rotor blade segment mounted over the main blade structure between the root section and the tip section. The at least one rotor blade segment includes an outer skin. The outer skin defines a continuous outer surface of the rotor blade segment. The continuous outer surface includes a pressure side surface extending between a pressure side aft edge and a pressure side forward edge, a suction side surface extending between a suction side forward edge and a suction side aft edge, and a seamless leading edge surface extending between the pressure side forward edge and the suction side forward edge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 illustrates a cross-sectional view of one embodiment of a rotor blade segment and a heated mandrel according to the present disclosure;

FIG. 5 illustrates a cross-sectional view of one embodiment of a rotor blade segment and an external heat source according to the present disclosure;

DETAILED DESCRIPTION OF THE INVENTION

Figure 1:
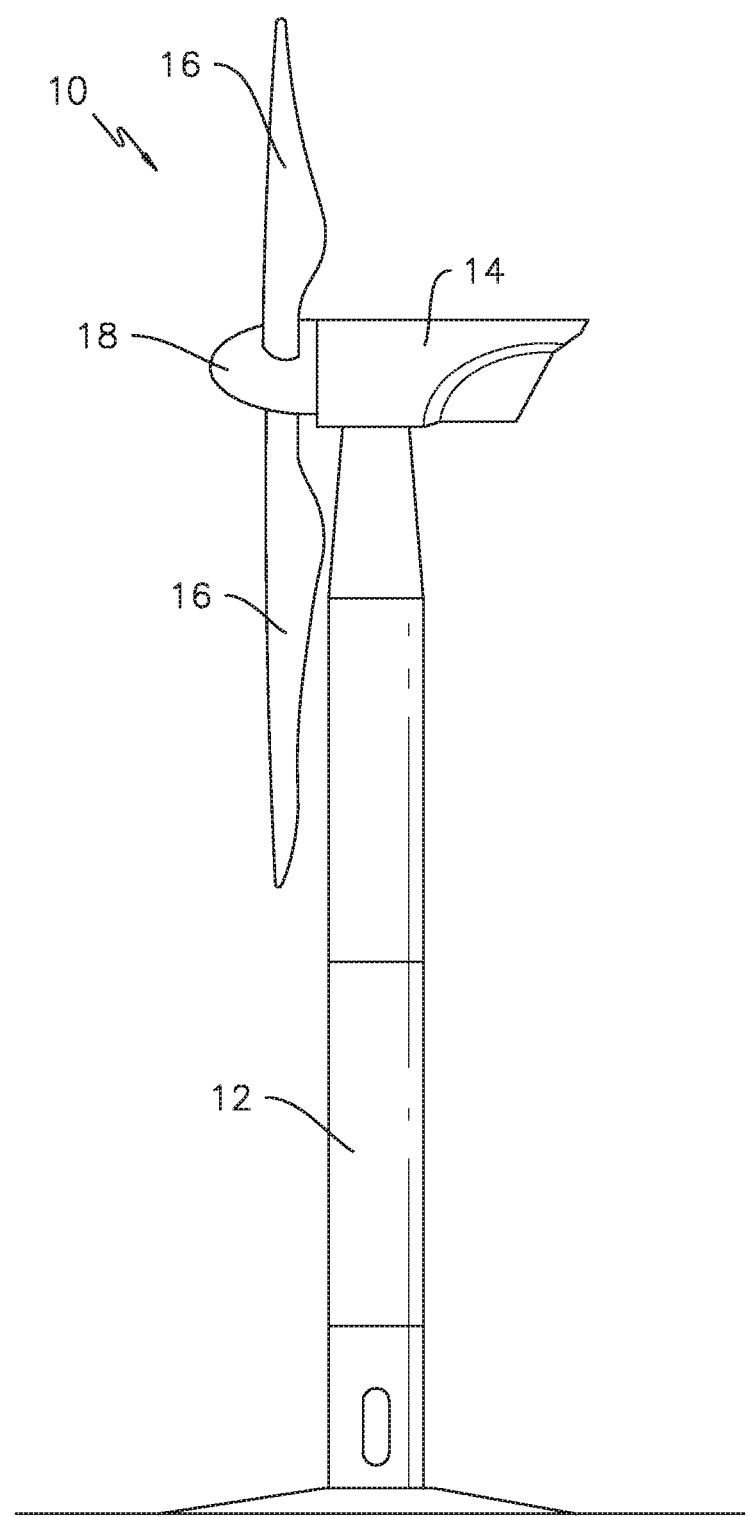
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine rotor blades and components thereof using automated deposition of materials via technologies such as 3-D Printing, additive manufacturing, automated fiber deposition, as well as other techniques that utilize computer numeric control ("CNC") and multiple degrees of freedom to deposit material. Thus, the methods described herein provide many advantages not present in the prior art. For example, the methods of the present disclosure provide the ability to easily customize blade structures having various curvatures, aerodynamic characteristics, strengths, stiffness, etc. As such, the printed structures of the present disclosure can be designed to match the stiffness and/or buckling resistance of existing sandwich panels rotor blades. More specifically, the printed structures typically contain hollow structures, which allow the printed structures to be less limited in height because the structures are not completely filled with foam and infusion resin, which is typical for conventional sandwich panels. As such, the rotor blades and components thereof of the present disclosure can be more easily customized based on the local buckling resistance needed. For example, if there is an area of high buckling in the structural analysis, the rib and/or stringer structure of the rotor blade can be printed in a tighter pattern or taller pattern or both to alleviate the area of concern, while using a more open or shorter structure in areas of reduced buckling issues. Further, if desirable, the structure can be built to connect or abut against a structure on the opposite side of the rotor blade in select areas. As such, the methods of the present disclosure are also useful for intentionally allowing less buckling resistance in the rotor blades in select areas to allow buckling during extreme gust events to promote load shedding.

In addition, the methods of the present disclosure provide a high level of automation, faster throughput, and reduced tooling costs and/or higher tooling utilization. Further, the rotor blades of the present disclosure may not require adhesives, especially those produced with thermoplastic materials, thereby eliminating cost, quality issues, and extra weight associated with bond paste.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange (not shown) that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
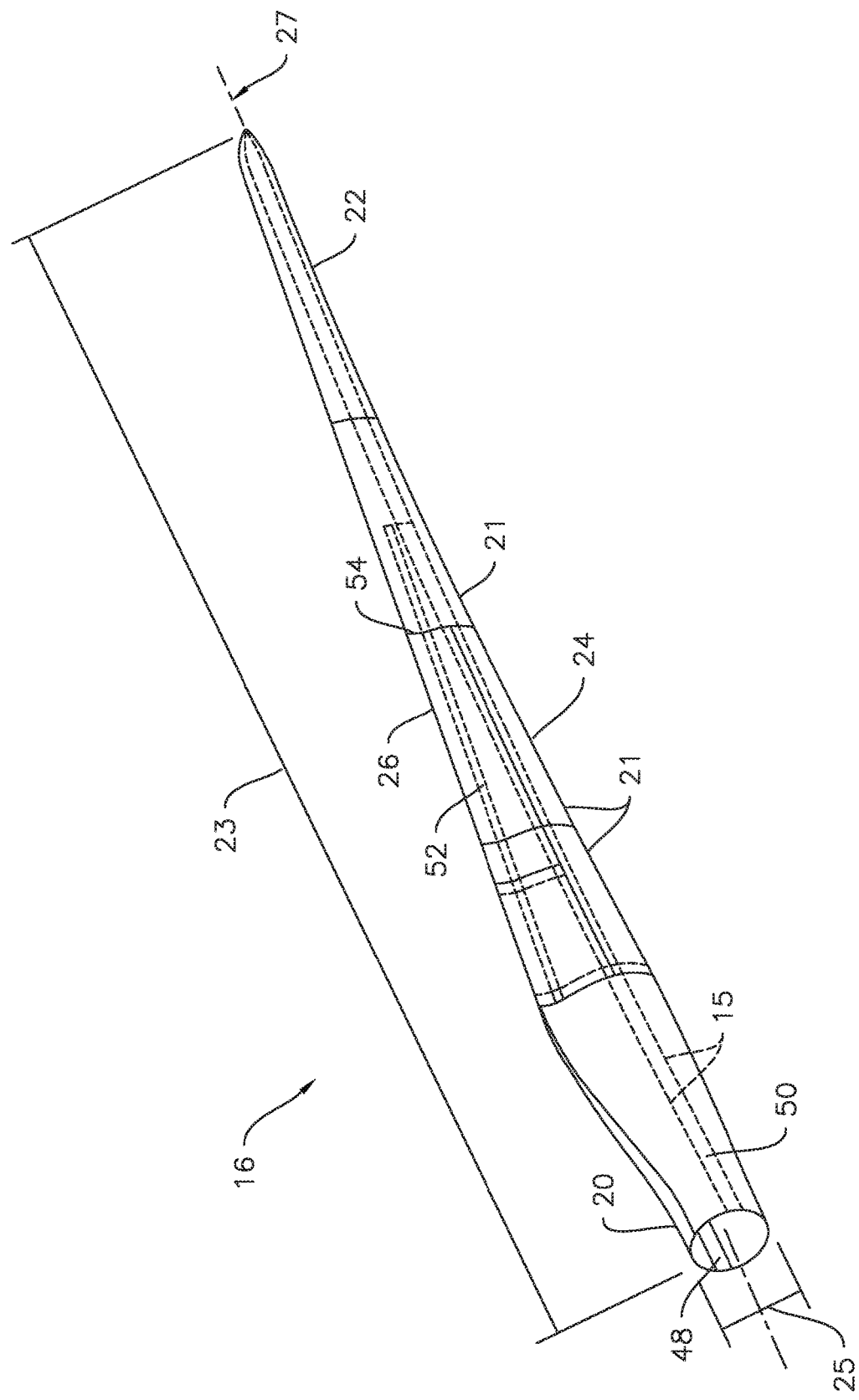
FIG. 2 illustrates a perspective view of one embodiment of a rotor blade of a wind turbine according to the present disclosure.

Referring now to FIG. 2, an example rotor blade 16 according to the present disclosure is illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethyl-methyl acrylate, polyesters, polycarbonates, and/or acetyls. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, one or more shear webs 35 (FIG. 7), an additional structural component 52 secured to the blade root section 20, and/or any other suitable structural component of the rotor blade 16. Further, the blade root section 20 is configured to be mounted or otherwise secured to the rotor hub 18 (FIG. 1). In addition, as shown in FIG. 2, the rotor blade 16 defines a span 23 that is equal to the total length between the blade root section 20 and the blade tip section 22. As shown in FIG. 2, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

As illustrated in FIG. 2, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 54. Alternatively, in certain embodiments, the various segments of the rotor blade 16 may be secured together via an adhesive or mechanical fasteners. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials.

In various embodiments, the rotor blade 16 may include more or fewer spar caps than the two spar caps 48 and 50 depicted in the illustrated example embodiments herein. For example, in some embodiments, the spar caps may include a pair of spar caps, each of which is a unitary monolithic structure extending from the root section 20 to the tip section 22. In other example embodiments, the spar caps may comprise a plurality of segments joined together, e.g., a first spar cap or set of spar caps formed in the blade root section 20, a second pair spar cap or set of spar caps formed in one or more intermediate segments 21, and a third spar cap or set of spar caps formed in the blade tip section 22. Thus, in certain embodiments, the blade root section 20 and the blade tip section 22 may be joined together via their respective spar caps.

The spar caps, e.g., 48, 50 may be configured to be engaged against opposing inner surfaces of the blade segments 21 of the rotor blade 16. Thus, the spar caps may generally be designed to control the bending stresses and/or other loads acting on the rotor blade 16 in a generally span-wise direction (a direction parallel to the span 23 of the rotor blade 16) during operation of a wind turbine 10. In addition, the spar caps may be designed to withstand the span-wise compression occurring during operation of the wind turbine 10.

The spar caps, e.g., 48, 50, may be constructed of any suitable materials, e.g., a thermoplastic or thermoset material or combinations thereof. Further, the spar caps may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps may be formed of the same pre-cured composites or different pre-cured composites. In addition, the pultruded components may be produced from rovings, which generally encompass long and narrow bundles of fibers that are not combined until joined by a cured resin.

Figure 7:
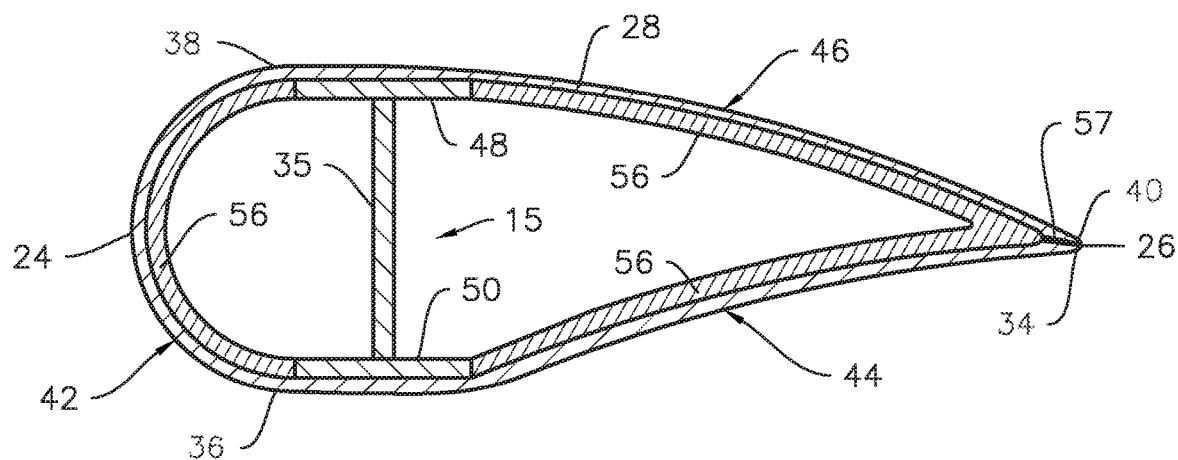
FIG. 7 illustrates a cross-sectional view of one embodiment of a rotor blade segment according to the present disclosure.

As shown in FIG. 7, one or more shear webs 35 may be configured between the one or more spar caps 48, 50. As shown, the structure 15 may have an I-beam configuration with a single shear web 35 and two opposing spar caps 48, 50. More particularly, the shear web(s) 35 may be configured to increase the rigidity in the blade root section 20 and/or the blade tip section 22. Further, the shear web(s) 35 may be configured to close out the blade root section 20.

In addition, as shown in FIG. 2, the additional structural component 52 may be secured to the blade root section 20 and extend in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the various blade segments 21 can be mounted thereto.

Referring now to FIGS. 3-7, the present disclosure is directed to methods of manufacturing a rotor blade segment of a wind turbine, such as the rotor blade segment 21 of the rotor blade 16 illustrated in FIG. 2 via 3-D printing. 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes. Further, it is to be understood that the present method is not limited to intermediate segments 21, but may also or instead be applied to manufacturing one or both of the root section 20 or the tip section 22, e.g., as shown in FIG. 2.

In some embodiments, the method of manufacturing a rotor blade segment 21 of a wind turbine 10 may include forming or providing an outer skin 28, which may be a generally flat fiber-reinforced outer skin 28. For example, the fiber-reinforced outer skin 28 may be a continuous, multi-axial (e.g. biaxial) fiber-reinforced thermoplastic or thermoset outer skin. The generally flat fiber-reinforced outer skin 28 may define a continuous outer surface 30 comprising a pressure side surface 44 extending between a pressure side aft edge 34 and a pressure side forward edge 36, a suction side surface 46 extending between a suction side forward edge 38 and a suction side aft edge 40, and a leading edge surface 42 extending between the pressure side forward edge 36 and the suction side forward edge 38. As used herein, the term "leading edge surface" refers to a surface which includes the leading edge 24 of the rotor blade segment 21 and extends between the pressure side surface 44 and the suction side surface 46.

In addition, in certain embodiments, the fiber-reinforced outer skin 28 may include continuous multi-axial fibers, such as biaxial fibers. Further, in particular embodiments, the method may include forming the outer skin 28 via at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

In some embodiments, the method may include forming at least one three-dimensional reinforcement structure 56 on an inner surface 32 of the outer skin 28. For example, forming the at least one three-dimensional reinforcement structure 56 may include printing and depositing the at least one three-dimensional reinforcement structure 56 via a computer numeric control device 300 (FIG. 3) onto the inner surface 32 of the outer skin 28. As generally shown in FIGS. 3-7, the three-dimensional reinforcement structure 56 may comprise any desired shape, e.g., the structure 56 may be uniformly deposited on the inner surface 32 of the outer skin 28 (FIG. 7), the structure 56 may be symmetrical or asymmetrical, and/or the structure 56 may be formed in a varied thickness on the inner surface 32 of the outer skin 28 (e.g., FIGS. 5 and 6).

In certain embodiments, the step of forming the outer skin 28 of the rotor blade segment 21 may include providing a generally flat fiber-reinforced outer skin, forcing the outer skin 28 into a desired shape corresponding to a contour of the outer surface 30 of the rotor blade segment 21, and maintaining the outer skin 28 in the desired shape during forming the at least one three-dimensional reinforcement structure 56. For example, forcing the outer skin 28 into a desired shape may include forming the outer skin 28 on a mold 100. For example, the outer skin 28 may be held in place while printing and depositing the reinforcement structure 56 on the inner surface 32 of the outer skin 28. As such, the outer skin 28 generally retains the desired shape when the outer skin 28 and the reinforcement structure 56 printed thereto are released. In particular, the outer skin 28 may generally retain the desired shape in at least areas where the reinforcement structure 56 was formed, e.g., printed and deposited.

In certain embodiments, the outer skin 28 may be forced into and maintained in the desired shape during printing and depositing via a tooling device. For example, in particular embodiments, the tooling device may include vacuum, one or more magnets, one or more mechanical devices, one or more adhesives, a heating system, a cooling system, or any combination thereof. The structure and function of such tooling devices are generally understood by those of skill in the art, as such, are not described in further detail herein.

Figure 3:
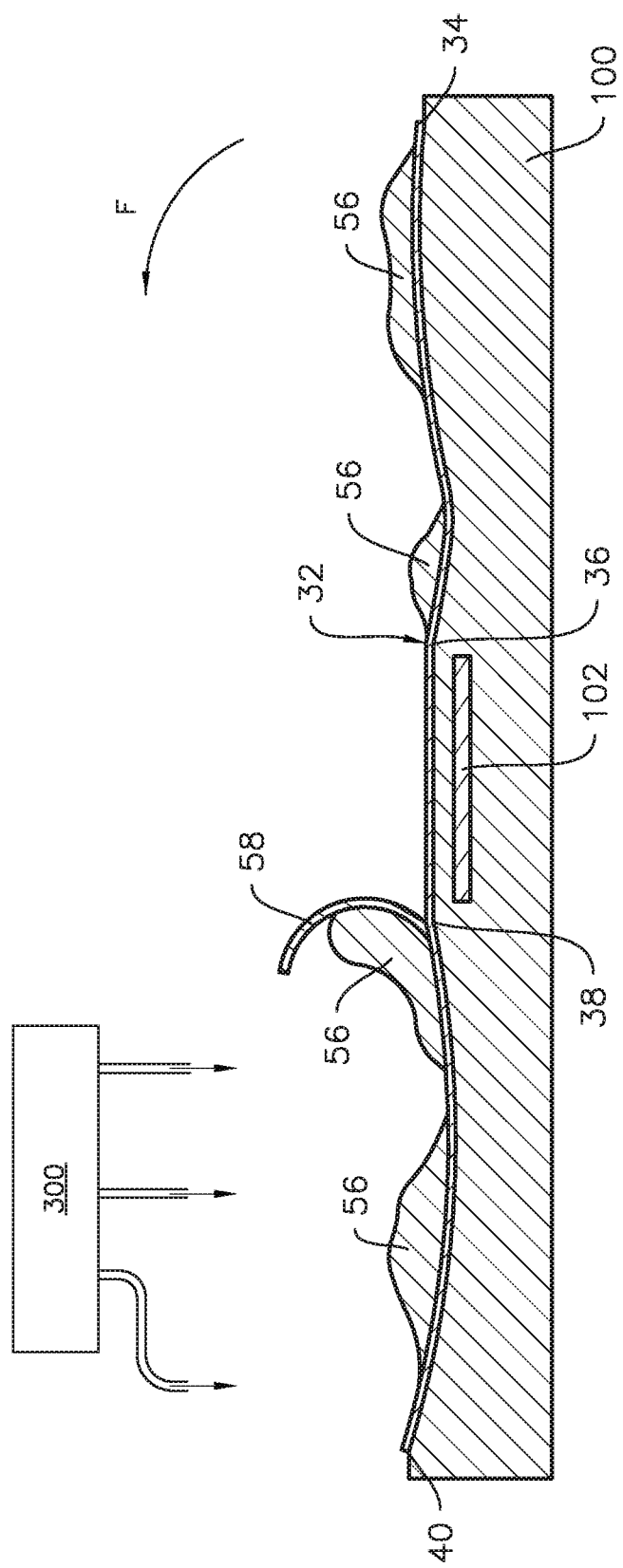
FIG. 3 illustrates a cross-sectional view of one embodiment of a rotor blade segment and a mold according to the present disclosure.
Figure 6:
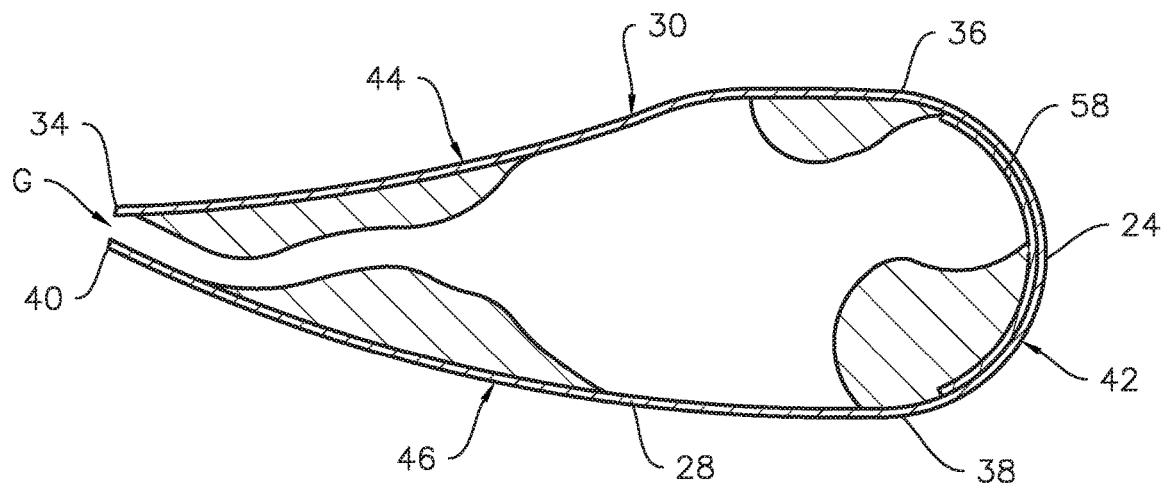
FIG. 6 illustrates a cross-sectional view of one embodiment of a rotor blade segment according to the present disclosure.

Additionally, the method may include folding the outer skin 28 around the at least one three-dimensional reinforcement structure 56, for example along a folding direction F, as shown in FIG. 3. After folding the outer skin 28, the pressure side surface 44 is positioned opposite the suction side surface 46 and the pressure side aft edge 34 is proximate the suction side aft edge 40, as shown in FIG. 6. As mentioned, the outer skin 28 may comprise a thermoplastic material. Accordingly, in some embodiments where the outer skin 28 comprises a thermoplastic material, the method may include applying heat to the leading edge surface 42 of the outer skin 28 prior to folding the outer skin 28. Applying heat to the thermoplastic material at the leading edge surface 42 causes the thermoplastic material to become more pliant and may facilitate easier folding of the outer skin 28.

As shown in FIG. 3, in at least some embodiments including the mold 100, the mold 100 may have an independent heater 102 in a central portion of the mold 100. The independent heater 102 may be considered independent in that it is configured to apply heat to the leading edge surface 42 of the rotor blade segment 21 independent of the pressure side surface 44 and the suction side surface 46, e.g., where the applied heat may make the thermoplastic material of the leading edge surface 42 sufficiently pliant to facilitate folding of the outer skin 28 while the heat applied to the pressure side surface 44 and the suction side surface 46, if any, does not create a significant increase in the malleability of the pressure side surface 44 or the suction side surface 46. Accordingly, the independent heater 102 may facilitate folding the outer skin 28 without deforming the pressure side surface 44 or the suction side surface 46 of the outer skin 28, e.g., without attenuating or creating wrinkles in the pressure side surface 44 or the suction side surface 46. Thus, applying heat to the leading edge surface 42 may also include activating the independent heater 102 in the central portion of the mold 100.

In other embodiments, the mold 100 may not include the independent heater 102 and/or the method may not include activating the independent heater 102. For example, as illustrated in FIG. 4 applying heat to the leading edge surface 42 may include positioning the leading edge surface 42 of the outer skin 28 in thermal communication with a heated mandrel 200 prior to folding the outer skin 28. Further, folding the outer skin 28 may include folding the outer skin 28 over the heated mandrel 200. Folding the outer skin 28 over the heated mandrel 200 may include gradually removing the heated mandrel 200 in a span-wise direction (e.g., into or out of the plane of FIG. 4) from the rotor blade segment 21 as the pressure side aft edge 34 and the suction side aft edge 40 approach one another. The heated mandrel 200 may be sized to generally correspond to the leading edge surface 42, e.g., as shown in FIG. 4. Thus, similar to the independent heater 102 described above, the heated mandrel 200 may facilitate folding the outer skin 28 without deforming the pressure side surface 44 or the suction side surface 46 of the outer skin 28. As another example, applying heat to the leading edge surface 42 may include applying heat to the leading edge surface 42 with an external heat source, such as an infrared heater 400 (FIG. 5) prior to bending the outer skin 28 around the preformed reinforcement structure 56.

As mentioned above, the fiber-reinforced outer skin 28 may be a multi-axial (e.g. biaxial) fiber-reinforced thermoplastic or thermoset outer skin. In addition, as shown, the outer surface 30 of the rotor blade segment 21 may be curved. In embodiments where the at least one three-dimensional reinforcement structure 56 is formed using a CNC device, the CNC device may be configured to print and deposit the three-dimensional reinforcement structure 56 onto an inner surface 32 of the fiber-reinforced outer skin 28. As such, the CNC device may be adapted to include a tooling path that follows a contour of the curved outer surface 30 of the rotor blade segment 21 such that the CNC device deposits the reinforcement structure 56 along the contour of the inner surface 32 of the outer skin 28. In particular embodiments, the CNC device may deposit the reinforcement structure 56 along the contour of the inner surface 32 in areas away from what will be leading edge 24, e.g., in areas of inner surface 32 which correspond to the pressure side surface 44 and/or the suction side surface 46. In areas of the inner surface 32 proximate the leading edge 24, a reinforcement may be built that has the final shape of the inner surface 32 after the outer surface 28 is bent around the structure 56, the final shape of the inner surface 32 may be seen, e.g., in FIG. 7. When deposited by the CNC device as described herein, the reinforcement structure 56 bonds to the fiber-reinforced outer skin 28 as the reinforcement structure 56 is being deposited. As such, suitable materials for the printed reinforcement 56 and the outer skin 28 may be chosen such that the printed reinforcement 56 bonds to the outer skin 28 during deposition.

In some embodiments, the rotor blade segment 21 may include a bond cap 58. For example, the method may include adding a bond cap 58 between the at least one three-dimensional reinforcement structure 56 and the leading edge surface 42 prior to folding the outer skin 28. In some embodiments, the bond cap 58 may be a separate piece previously formed and inserted between the at least one three-dimensional reinforcement structure 56 and the leading edge surface 42. In other embodiments, forming the at least one three-dimensional reinforcement structure 56 may include forming the bond cap 58 proximate the leading edge surface 42 while forming the at least one three-dimensional reinforcement structure 56. For example, in embodiments where the reinforcement structure 56 is formed by printing and depositing, printing and depositing the at least one three-dimensional reinforcement structure 56 via a computer numeric control device onto the inner surface 32 of the outer skin 28 may also include printing and depositing the bond cap 58 in the same printing and depositing operation. Accordingly, the bond cap 58 may be integral with the at least one three-dimensional reinforcement structure 56.

As shown in FIG. 6, the pressure side aft edge 34 and the suction side aft edge 40 are spaced apart such that a gap G is defined between the pressure side aft edge 34 and the suction side aft edge 40 after folding the outer skin 28. In some embodiments, the method may further include joining the pressure side aft edge 34 and the suction side aft edge 40 after folding the outer skin 28. Joining the pressure side aft edge 34 and the suction side aft edge 40 may close and seal the gap G and create a single joint 57 at the trailing edge 26. The single joint 57 may be the only joint in the rotor blade segment 21, and in particular may be the only span-wise joint in the rotor blade segment, such that the leading edge surface 42 may be free of joints.

The gap G may aid in assembling the rotor blade segment 21 prior to joining the pressure side aft edge 34 and the suction side aft edge 40. For example, the segment 21 may be easily mounted to the main blade structure 15 by separating the pressure and suction side surfaces 44, 46 at the gap G, mounting the blade segment 21 over the one or more spar caps 48, 50, and securing the blade segment 21 to the one or more spar caps 48, 50, e.g., by welding the outer skin 28 to the one or more spar caps 48, 50, prior to joining the pressure side aft edge 34 and the suction side aft edge 40. Separating the pressure and suction side surfaces 44, 46 at the gap G may include moving the pressure side surface 44 and the suction side surface 46 farther apart such that the gap G expands. The outer skin 28 may be mounted over the structural element 15 of the rotor blade 16 while the gap G is expanded. In some embodiments, the pressure side aft edge 34 and the suction side aft edge 40 may be joined by welding the pressure side aft edge 34 and the suction side aft edge 40. In other example embodiments, the pressure aft edge 34 and the suction side aft edge 40 may be joined with an adhesive paste.

In another embodiment, the method may further include treating the inner surface 32 of the outer skin 28 to promote bonding between the outer skin 28 and the reinforcement structure 56. More specifically, in certain embodiments, the step of treating the inner surface 32 may include flame treating, plasma treating, chemical treating, chemical etching, mechanical abrading, embossing, elevating a temperature of at least areas to be printed on the outer skins 28, and/or any other suitable treatment method to promote bonding of the reinforcement structure 56 and the inner surface 32 of the outer skin 28. In additional embodiments, the method may include forming the outer skin 28 with more (or even less) matrix resin material on the inside surface 32 to promote said bonding.

In additional embodiments, the method may include varying the outer skin thickness and/or fiber content, as well as the fiber orientation. Further, the method may include varying the design of the spar caps 48, 50 and/or shear web 35 (e.g. width, height, etc.). For example, in some embodiments, the method may include printing taller reinforcement structures for the pressure side that bond (or abut against) taller structures of the suction side to create additional auxiliary type shear webs/spars depending on the design need.

In additional embodiments, the method may also include printing one or more features at the trailing and/or leading edges 24, 26 of the rotor blade segments that are configured to overlap, e.g. such as interlocking edges or snap fits. Further, the method may include printing the rotor blade segments to include features configured to align the spar caps therein.

When manufactured according to the methods shown and described herein, the rotor blade 16 may include a non-jointed, continuous blade surface constructed at least in part of a thermoplastic material. The non-jointed, continuous blade surface does not require bonding of multiple spanwise segments. For example, at least the leading edge surface 42 may be a non-jointed and continuous surface. In such embodiments, the rotor blade segment 21 may include a single joint 57 at the trailing edge 26. Thus, the single-jointed blade segment 21 only requires one joint instead of multiple joints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a rotor blade segment of a wind turbine, the rotor blade segment having a seamless leading edge surface, the method comprising:
   providing a generally flat fiber-reinforced outer skin comprising a thermoplastic material, the generally flat fiber-reinforced outer skin defining a continuous outer surface comprising a pressure side surface extending between a pressure side aft edge and a pressure side forward edge, a suction side surface extending between a suction side forward edge and a suction side aft edge, and the seamless leading edge surface extending between the pressure side forward edge and the suction side forward edge;
   forming the fiber-reinforced outer skin into a desired shape corresponding to a contour of the outer surface of the rotor blade;
   applying heat to the seamless leading edge surface of the fiber-reinforced outer skin whereby the thermoplastic material becomes pliant at the leading edge surface and without significantly increasing malleability of the pressure side surface or the suction side surface, whereby the fiber-reinforced outer skin can be folded without attenuating or creating wrinkles in the pressure side surface or the suction side surface; and,
   folding the fiber-reinforced outer skin about the seamless leading edge surface without attenuating or creating wrinkles in the pressure side surface or the suction side surface, whereby the pressure side surface is positioned opposite the suction side surface and the pressure side aft edge is proximate the suction side aft edge.

2. The method of claim 1, wherein forming the fiber-reinforced outer skin into a desired shape comprises forming the fiber-reinforced outer skin on a mold, and wherein applying heat to the seamless leading edge surface comprises activating one or more independent heaters in a central portion of the mold.

3. The method of claim 1, wherein applying heat to the seamless leading edge surface comprises positioning the seamless leading edge surface of the fiber-reinforced outer skin in thermal communication with a heated mandrel prior to folding the fiber-reinforced outer skin, wherein folding the fiber-reinforced outer skin comprises folding the fiber-reinforced outer skin over the heated mandrel.

4. The method of claim 1, wherein applying heat to the seamless leading edge surface comprises applying heat to the seamless leading edge surface via an infrared heater prior to folding the fiber-reinforced outer skin about the seamless leading edge surface.

5. The method of claim 1, wherein forming the fiber-reinforced outer skin into the desired shape comprises forcing into the fiber-reinforced outer skin into the desired shape and maintaining the fiber-reinforced outer skin in the desired shape via a tooling device, the tooling device comprising at least one of vacuum, pressure, one or more magnets, one or more mechanical devices, one or more adhesives, a heating system, a cooling system, or any combination thereof.

6. The method of claim 1, wherein the pressure side aft edge and the suction side aft edge are spaced apart such that a gap is defined between the pressure side aft edge and the suction side aft edge after folding the fiber-reinforced outer skin, further comprising moving the pressure surface and the suction side surface farther apart such that the gap expands, mounting the fiber-reinforced outer skin over a structural element of the rotor blade while the gap is expanded, and joining the pressure side aft edge and the suction side aft edge after mounting the fiber-reinforced outer skin over the structural element.

7. A method of manufacturing a rotor blade segment of a wind turbine, the rotor blade segment having a seamless leading edge surface, the method comprising:
   forming an outer skin of the rotor blade segment comprising a thermoplastic material, the outer skin defining a continuous outer surface comprising a pressure side surface extending between a pressure side aft edge and a pressure side forward edge, a suction side surface extending between a suction side forward edge and a suction side aft edge, and the seamless leading edge surface extending between the pressure side forward edge and the suction side forward edge;
   forming at least one three-dimensional reinforcement structure on an inner surface of the outer skin;
   applying heat to the seamless leading edge surface of the fiber-reinforced outer skin whereby the thermoplastic material becomes pliant at the leading edge surface and without significantly increasing malleability of the pressure side surface or the suction side surface, whereby the fiber-reinforced outer skin can be folded without attenuating or creating wrinkles in the pressure side surface or the suction side surface; and
   folding the outer skin around the at least one three-dimensional reinforcement structure without attenuating or creating wrinkles in the pressure side surface or the suction side surface, whereby the pressure side surface is positioned opposite the suction side surface and the pressure side aft edge is proximate the suction side aft edge.

8. The method of claim 7, wherein forming the outer skin comprises forming the outer skin on a mold, and wherein applying heat to the seamless leading edge surface comprises activating an independent heater in a central portion of the mold.

9. The method of claim 7, wherein applying heat to the seamless leading edge surface comprises positioning the seamless leading edge surface of the outer skin in thermal communication with a heated mandrel prior to folding the outer skin, wherein folding the outer skin comprises folding the outer skin over the heated mandrel.

10. The method of claim 7 wherein applying heat to the seamless leading edge surface comprises applying heat to the seamless leading edge surface via an infrared heater prior to folding the outer skin around the at least one three-dimensional reinforcement structure.

11. The method of claim 7, wherein forming the at least one three-dimensional reinforcement structure comprises printing and depositing the at least one three-dimensional reinforcement structure via a computer numeric control device onto the inner surface of the outer skin, wherein the at least one three-dimensional reinforcement structure bonds to the inner surface of the outer skin as the reinforcement structure is being deposited.

12. The method of claim 7, wherein the pressure side aft edge and the suction side aft edge are spaced apart such that a gap is defined between the pressure side aft edge and the suction side aft edge after folding the outer skin, further comprising moving the pressure surface and the suction side surface farther apart such that the gap expands, mounting the outer skin over a structural element of the rotor blade while the gap is expanded after folding the outer skin, and joining the pressure side aft edge and the suction side aft edge after mounting the outer skin over the structural element.

13. The method of claim 7, further comprising adding a bond cap between the at least one three-dimensional reinforcement structure and the seamless leading edge surface prior to folding the outer skin.

14. The method of claim 7, wherein forming the at least one three-dimensional reinforcement structure includes forming a bond cap proximate the seamless leading edge surface while forming the at least one three-dimensional reinforcement structure, the bond cap integral with the at least one three-dimensional reinforcement structure.

* * * * *